US012075551B2

(12) United States Patent
Melischnig et al.

(10) Patent No.: US 12,075,551 B2
(45) Date of Patent: Aug. 27, 2024

(54) METHOD OF OPERATING A PIEZOELECTRIC PLASMA GENERATOR

(71) Applicant: TDK Electronics AG, Munich (DE)

(72) Inventors: Alexander Melischnig, Graz (AT); Markus Puff, Graz (AT); Robert Krumphals, Deutschlandsberg (AT); Amnon Lam, Kibbutz Giv'at Oz (IL); Eliezer Fuchs, Kibbutz Megiddo (IL); Betsalel Rechav, Nes Ziona (IL)

(73) Assignee: TDK Electronics AG, Munich (DE)

( * ) Notice: Subject to any disclaimer, the term of this patent is extended or adjusted under 35 U.S.C. 154(b) by 177 days.

(21) Appl. No.: 17/783,576

(22) PCT Filed: Dec. 17, 2020

(86) PCT No.: PCT/EP2020/086771
§ 371 (c)(1),
(2) Date: Jun. 8, 2022

(87) PCT Pub. No.: WO2021/122995
PCT Pub. Date: Jun. 24, 2021

(65) Prior Publication Data

US 2023/0007764 A1 Jan. 5, 2023

(30) Foreign Application Priority Data

Dec. 20, 2019 (DE) ........................ 102019135497.8

(51) Int. Cl.
*H05H 1/24* (2006.01)

(52) U.S. Cl.
CPC ....... *H05H 1/2481* (2021.05); *H05H 2242/22* (2021.05)

(58) Field of Classification Search
None
See application file for complete search history.

(56) References Cited

U.S. PATENT DOCUMENTS

| | | | | |
|---|---|---|---|---|
| 9,788,404 | B2 * | 10/2017 | Nettesheim | H05H 1/24 |
| 10,638,590 | B2 * | 4/2020 | Weilguni | H10N 30/804 |
| 11,490,947 | B2 * | 11/2022 | Winkelman | A61Q 1/145 |
| 11,716,805 | B2 * | 8/2023 | Long | H01J 37/32183 315/350 |

(Continued)

FOREIGN PATENT DOCUMENTS

| | | | |
|---|---|---|---|
| DE | 19616187 | A1 | 11/1997 |
| DE | 19836561 | A1 | 2/2000 |

(Continued)

OTHER PUBLICATIONS

Examination Report in related Japanese Patent Application No. 2022-536974, dated Apr. 25, 2023 (3 pages).

(Continued)

*Primary Examiner* — Srinivas Sathiraju
(74) *Attorney, Agent, or Firm* — Nixon Peabody LLP

(57) ABSTRACT

A method of operating a piezoelectric plasma generator including applying an input signal to a piezoelectric transformer of the piezoelectric plasma generator. An absolute value of a peak amplitude of the input signal is periodically reduced and increased to a level smaller and larger than an ignition voltage of the plasma generator, such that plasma generation periodically collapses.

16 Claims, 6 Drawing Sheets

(56) References Cited

U.S. PATENT DOCUMENTS

| | | | | |
|---|---|---|---|---|
| 11,769,651 | B2 * | 9/2023 | Fukano | H01J 37/32183 219/121.54 |
| 2009/0122941 | A1 * | 5/2009 | Engemann | H05H 1/2475 376/145 |
| 2009/0135538 | A1 * | 5/2009 | Yasuoka | H05H 1/2481 310/318 |
| 2017/0352523 | A1 * | 12/2017 | Kasai | H05H 1/46 |
| 2018/0368244 | A1 * | 12/2018 | Rinner | H10N 30/88 |
| 2018/0375013 | A1 * | 12/2018 | Weilguni | C01B 13/11 |
| 2019/0008027 | A1 * | 1/2019 | Weilguni | H10N 30/804 |
| 2019/0051813 | A1 * | 2/2019 | Döllgast | H10N 30/045 |
| 2019/0093261 | A1 | 3/2019 | Poon | |
| 2019/0098739 | A1 * | 3/2019 | Weilguni | H05H 1/2475 |
| 2019/0198746 | A1 * | 6/2019 | Weilguni | H03F 3/2176 |
| 2019/0210065 | A1 * | 7/2019 | Rinner | G06F 3/016 |
| 2019/0252598 | A1 * | 8/2019 | Doellgast | H10N 30/40 |
| 2020/0053862 | A1 * | 2/2020 | Shiohara | H10N 30/40 |
| 2020/0077502 | A1 * | 3/2020 | Weilguni | H10N 30/40 |
| 2020/0131093 | A1 * | 4/2020 | Orosel | C04B 35/491 |
| 2020/0137865 | A1 * | 4/2020 | Pichler | H10N 30/40 |
| 2020/0137866 | A1 * | 4/2020 | Nettesheim | H10N 30/20 |
| 2020/0179030 | A1 | 6/2020 | Zenker | |
| 2020/0287405 | A1 * | 9/2020 | Rinner | H02S 40/38 |
| 2020/0352620 | A1 * | 11/2020 | Winkelman | A61B 18/042 |
| 2020/0411745 | A1 * | 12/2020 | Miskovic | H10N 30/804 |
| 2021/0111331 | A1 * | 4/2021 | Nettesheim | H01G 4/12 |
| 2022/0304134 | A1 * | 9/2022 | Krumphals | H05H 1/2481 |
| 2023/0007764 | A1 * | 1/2023 | Melischnig | H05H 1/2481 |

FOREIGN PATENT DOCUMENTS

| | | | |
|---|---|---|---|
| DE | 102015112410 | A1 | 2/2017 |
| DE | 102015119574 | A1 | 5/2017 |
| DE | 102016110141 | A1 | 12/2017 |
| DE | 102017105401 | A1 | 9/2018 |
| DE | 102017105415 | A1 | 9/2018 |
| EP | 3662854 | A1 | 6/2020 |
| JP | 2019500743 | A | 1/2019 |
| WO | WO 2015/083155 | A1 | 6/2015 |
| WO | WO 2016/093269 | A1 | 6/2016 |
| WO | WO 2018/093261 | A1 | 5/2018 |

OTHER PUBLICATIONS

International Search Report and Written Opinion of International Searching Authority corresponding to International Patent Application No. PCT/EP2020/086771, mailed Apr. 9, 2021 (13 pages).

Facta Mochammad et al: “Piezoelectric transformer with pulse dropping technique for high voltage generation”; 2016 2nd international conference of industrial, mechanical, electrical, and chemical engineering (ICIMECE), Jan. 1, 2016, pp. 10-13, XP055790791; DOI: 10.1109/ICIMECE.2016.7910415; ISBN: 978-1-5090-4161-9 (4 pages).

Norm Din EN 60601-1 (VDE 0750-1); Dec. 2013. Medizinische elektrische Geräte-Teil 1: Allgemeine Festlegungen für die Sicherheit einschließlich der wesentlichen Leistungsmerkmale (IEC 60601-1: 2005 + Cor.: 2006 + Cor.: 2007 + A1:2021); Deutsche Fassung EN 60601-1: 2006 + Cor.: 2010 + A1: 2013; See English-language version: “International Standard: IEC 60601-1; Medical electrical equipment—Part 1: General requirements for basic safety and essential performance”; Third Edition; Dec. 2005 (288 pages).

* cited by examiner

METHOD OF OPERATING A PIEZOELECTRIC PLASMA GENERATOR

CROSS-REFERENCE TO RELATED APPLICATIONS

This application is a U.S. National Stage of International Application No. PCT/EP2020/086771, filed Dec. 17, 2020, which claims priority to and the benefit of Germany Patent Application No. 102019135497.8, filed Dec. 20, 2019, both of which are incorporated herein by reference in their entireties.

FIELD

The present invention relates to a method of operating a piezoelectric plasma generator. In particular, the plasma generator generates a non-thermal plasma. The plasma may be generated under atmospheric conditions. The plasma generator may be used for treatment of sensitive surfaces such as thin fabric or skin, for example.

BACKGROUND

Patent application DE 10 2017 105 415 A1 discloses a piezoelectric plasma generator for generating a non-thermal plasma in which an input signal is optimized such that a field strength at an output region of the transformer is maximized. Patent application DE 10 2015 119 574 A1 discloses a method for generating a non-thermal plasma in which a control circuit comprises an inductance and wherein an average current is measured for controlling an input frequency of the transformer. Patent application DE 10 2015 112 410 A2 discloses a method of operating a piezoelectric plasma generator, in which a phase information of an input impedance is determined and a frequency of an input signal is controlled depending on the phase information.

DE 10 2017 105 401 A1 discloses a piezoelectric plasma generator in which an input voltage is modulated such that an ultrasonic signal is generated in addition to generating a plasma.

Patent application WO 2015/083155 A1 discloses a radio-frequency (RF) plasma generator in which a non-thermal plasma is generated by a radio-frequency (RF) electromagnetic (EM) field. In order to prevent an undesired electric arc, the RF power may be turned off for a short time during operation.

DE 10 2016 110 141 A1 discloses a method for operating an HF plasma generator, wherein an input voltage is periodically lowered to a level in which plasma discharge is maintained. EP 3 662 854 A1 discloses a method for operating an HF plasma generator, in which the input voltage is dynamically adapted in order to maintain a plasma and at the same time minimize unwanted side effects, such as light and noise production. DE 19 616 187 A1 discloses a method for operating a transformer for generating a plasma, wherein short voltage pulses are applied to an input voltage.

SUMMARY

It is an object of the present invention to provide an improved method of operating a piezoelectric plasma generator.

In one aspect, the present invention relates to a method of operating a piezoelectric plasma generator. Such a piezoelectric plasma generator comprises a piezoelectric transformer comprising an input side and an output side. An input signal, i.e. an input voltage, is applied to the input side. Due to the piezoelectric effect, a high output voltage may be generated at an end of the output side.

The input signal may be based on a base signal having a first frequency. A signal shape of a base signal may be a sinusoidal shape, for example. The base signal may have a constant first frequency. The first frequency may correspond to a resonance frequency of the piezoelectric transformer. The resonance frequency may be about 50 kHz, for example. “Corresponding” means that the first frequency is near or identical to the resonance frequency. When running the plasma generator at its resonance frequency, the efficiency of plasma generation is optimized.

The base signal may be modulated by a modulation signal having a second frequency being smaller than the first frequency.

The input signal is such that an absolute value of a peak amplitude of the input signal is periodically reduced and increased to a level smaller and larger than an ignition voltage of the plasma generator. The level smaller than the ignition voltage is such that plasma generation collapses. Accordingly, the lower level is not sufficient to maintain plasma generation. Accordingly, the base signal may be delimited by an envelope curve. The time length in which the absolute value of the peak amplitude is larger than the ignition voltage during one period of oscillation of the peak amplitude is the “on-time” and the time length in which the absolute value of the peak amplitude is smaller than the ignition voltage during one period of oscillation of the peak amplitude is the “off-time”.

The field strength on the output end of the piezoelectric transformer that is required for generating plasma is the ignition field strength. The input voltage required for generating the ignition field strength is the ignition voltage.

By periodically reducing the absolute value of the peak input voltage below the ignition voltage has the effect that an average energy input into the substrate can be reduced. In addition to that, the occurrence of so-called streamers may be prevented or reduced. When these streamers hit the surface of a sensitive substrate, e.g., thin fabric or skin, local burn marks may occur. Accordingly, sensitive substrates may be damaged, which is an undesirable effect. Furthermore, the thermal power can lead to an undue increase of temperature in the substrate, which can damage the substrate.

Controlling the occurrence of streamers and the average energy input is particularly important when plasma treating electronic components, which are very sensitive to electrostatic discharge. A plasma treatment may include cleaning and/or activating surfaces, for example. Furthermore, when the average energy input is reduced, an activation of delicate and sensitive structures such as thin insulating polymer foil or conductive metal paths is possible.

A further example for operation are substrates which are difficult to be activated, e.g. metallic/conductive surfaces such as sooty plastic materials. When a high current is present, the surface cannot be activated on a large scale and without temperature increase. This may be due to the plasma cloud being reduced in its volume due to the lower potential of the substrate. When periodically providing an input signal which is below an ignition voltage, the current flow is disrupted and a large-scaled activation without temperature increase is possible.

A further example is operation in environments in which the heat dissipation is low, e.g. in vacuum. In this case, the self-heating of the plasma generator cannot be dissipated and the reliability of the plasma generator is reduced. When reducing the absolute value of the peak voltage periodically below an ignition voltage, the inner temperature can be reduced while the plasma generation during the on-cycles can be maintained at the same level.

A further example for operation is operation with media which require high voltages for ionization, such as N2, SF6. For such media, the reliability of the plasma generators is generally reduced due to the self-heating at high power input. The self-heating can be reduced by turning the base voltage periodically off and on and choosing a suitable duty-cycle. Thereby, the reliability can be increased.

The modulating signal may be a modulating function scaling the base signal. The modulating signal may have values between 1 and 0, for example.

The modulating signal may be pulse-shaped. In particular, the modulating signal may switch periodically between a high level and a low level.

The high level may be 1. In this case, the modulated signal may correspond to the base signal during the high-level time. The low level may be zero. In this case, the input voltage is switched to zero during the low-level time.

In a further embodiment, the low level may be above zero. As an example, the high level may be 1.0 and the low level may be 0.5. In this case, an oscillation of the component can be maintained and the mechanical stress on the component can be reduced.

In a further embodiment, the modulating signal may be a continuously oscillating signal such as a sinusoidal signal, for example. In this case, also the input signal continuously oscillates which reduces the mechanical stress on the component. In particular, the modulating signal may have the shape of an absolute value of a sinusoidal signal.

According to an embodiment, a duty cycle of the input signal may be adjusted during operation of the plasma generator. The duty cycle is the proportion of "on-time" in which the absolute value of the peak amplitude is larger than the ignition voltage during one period of oscillation of the absolute value of the peak amplitude and one period of oscillation of the absolute value of the peak amplitude. One period of oscillation of the absolute value of the peak amplitude may correspond to one period of oscillation of the modulating signal.

In all embodiments, the absolute value of the peak amplitude during off-time, in which the absolute value of the peak amplitude is smaller than the ignition voltage, may be at least for most of the off-time above zero. Thereby, oscillation of the piezoelectric transformer can be maintained during off-time. In particular, the peak amplitude during off-time may be such that oscillation is maintained during the entire off-time between on-times. This has the advantage that the transition between plasma generation and collapse of plasma generation is smoother and less mechanical stress is imposed on the transformer.

The average energy emitted from the plasma generator depends on the duty cycle and frequency of the modulating signal. When the duty cycle is high, the average emitted energy is high. When the duty cycle is low, the average emitted energy is low.

Adjusting the duty cycle can be done almost stepless and a fine-tuning of the energy input is enabled. This is particularly important for sensitive substrates or for cosmetic and medical applications. The duty cycle may be adjusted while the frequency of the modulating signal is kept at a fixed value.

According to an embodiment, the duration of an off-time in which the peak amplitude is below the ignition voltage is at most 10 ms or at most 5 ms. By periodically reducing the absolute value of the peak amplitude, the ignition channel, i.e., a path of ionized gas extending from the output side of the transformer, is forced to break down again and again.

After reducing the absolute value of the peak amplitude, the high output voltage attenuates. When the output voltage falls below the ignition voltage, the current flow in the ignition channel collapses. However, the higher concentration of charge carriers in this area is maintained for a short period of time. When the base signal is turned on again during this time span, the new ignition of plasma is significantly easier and ignition happens at lower voltage. Due to the lower ignition voltage the mechanical stress on the component is reduced which leads to higher reliability.

According to an embodiment, the second frequency, i.e., the frequency of the modulating signal is at most 1/20 of the first frequency, i.e., the frequency of the base signal. This may ensure that the plasma generation stops even at a given inertness of the piezoelectric transformer.

After an off-time in which the absolute value of the peak amplitude is smaller than the ignition voltage, the first frequency, i.e., the frequency of the base signal may be adjusted to the resonance frequency of the plasma generator. For this aim, a parameter corresponding to a shift of the first frequency from the resonance frequency may be obtained and the frequency of the base signal is re-adjusted such that it corresponds to the resonance frequency.

This enables an optimum operation mode at varying loads, e.g., due to varying substrate characteristics, gas mixtures, materials or work distances.

According to a further aspect, a piezoelectric plasma generator comprising a piezoelectric transformer is disclosed. The plasma generator comprises a control circuit for providing an input signal to the piezoelectric transformer. The control circuit may be configured for operating the plasma generator according to the method described in the foregoing.

The control circuit may comprise a base signal generator for generating a base signal having a first frequency and a modulating signal generator for generating a modulating signal having a second frequency which is lower than the first frequency. The control circuit may further comprise a signal mixer for mixing the base signal with the modulating signal such that an input signal is provided wherein an absolute value of a peak amplitude of the input signal is periodically reduced and increased to a level smaller and larger than an ignition voltage of the plasma generator.

The control circuit may further comprises a measuring device for measuring a parameter related to an energy input provided by the plasma generator to a plasma-treated substrate, wherein the modulation signal is adjusted depending on the measured energy input.

The control circuit may be configured to adjust during operation a duty cycle, which is the proportion of on-time in which the absolute value of the peak amplitude is larger than the ignition voltage in one period of oscillation of the absolute value of the peak amplitude.

The control circuit may further comprise a measuring device for measuring a parameter related to a shift of the first frequency from a resonance frequency of the plasma generator. The measuring device may be the same measuring device used for measuring an energy input in a substrate or may be a further measuring device. Suitable measuring devices are disclosed in the cited patent applications at the beginning.

Depending on the measured shift, the control circuit may be configured to re-adjust the first frequency to correspond to the resonance frequency.

The present disclosure comprises several aspects of an invention. Every feature described with respect to one of the aspects is also disclosed herein with respect to the other aspect, even if the respective feature is not explicitly mentioned in the context of the specific aspect.

Further features, refinements and expediencies become apparent from the following description of the exemplary embodiments in connection with the figures.

DETAILED DESCRIPTION

Figure 1:
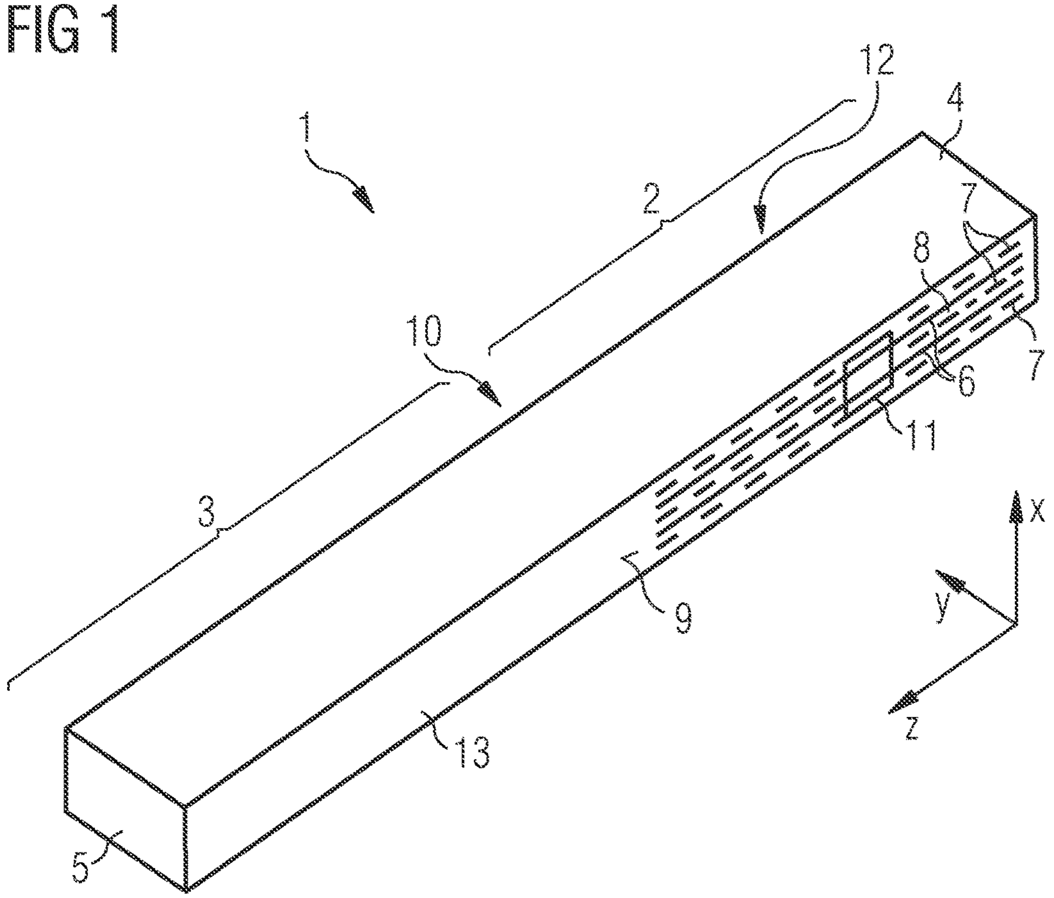
FIG. 1 shows a schematic illustration of a piezoelectric transformer for a piezoelectric plasma generator.

In the figures, elements of the same structure and/or functionality may be referenced by the same reference numerals. It is to be understood that the embodiments shown in the figures are illustrative representations and are not necessarily drawn to scale.

FIG. 1 shows a piezoelectric transformer 1 in a perspective view. The piezoelectric transformer 1 can be used in a plasma generator for generating a plasma, in particular a non-thermal low pressure plasma or an atmospheric pressure plasma or a high pressure plasma. A piezoelectric transformer 1 is an embodiment of a resonance transformer, which is based on piezoelectricity and, in contrast to conventional magnetic transformers, forms an electromechanical system. For example, the piezoelectric transformer 1 is a Rosen-type transformer. Alternatively, other types of piezoelectric transformers can be used.

The piezoelectric transformer 1 has a first region 2 that is an input region and a second region 3 that is an output region, wherein the direction from the first region 2 to the second region 3 defines a longitudinal direction z. The first region 2 comprises an input-side end region 4 and the second region 3 comprises an output-side end region 5.

In the first region 2, the piezoelectric transformer 1 comprises internal electrodes 6, 7 to which an alternating voltage can be applied. The internal electrodes 6, 7 extend in the longitudinal direction z of the piezoelectric transformer 1. The internal electrodes 6, 7 are stacked alternately with a piezoelectric material 8 in a stacking direction x, which is perpendicular to the longitudinal direction z. The piezoelectric material 8 is polarized in the stacking direction x.

The internal electrodes 6, 7 are arranged inside the piezoelectric transformer 1 between layers of piezoelectric material 8 and are also referred to as internal electrodes. The piezoelectric transformer 1 comprises a first side surface 9 and a second side surface 10, which is opposite the first side surface 9. On the first and second side surfaces 9, 10 external electrodes 11, 12 are arranged. The internal electrodes 6, 7 are alternately connected to one of the external electrodes 11, 12.

The second region 3 comprises a piezoelectric material 13 and is free of internal electrodes. The piezoelectric material 13 in the second region 3 is polarized in the longitudinal direction z. The piezoelectric material 13 of the second region 3 can be the same material as the piezoelectric material 8 of the first region 2.

The piezoelectric materials 8 and 13 differ in their respective polarization direction. In particular, in the second region 3 the piezoelectric material 13 is formed into a single monolithic layer, which is completely polarized in the longitudinal direction z. Thus, the piezoelectric material 13 in the second region 3 has only one single polarization direction.

Via the external electrodes 11, 12 a low alternating voltage can be applied between adjacent internal electrodes 6, 7 in the first region 2. Due to the piezoelectric effect of the piezoelectric material 8 the alternating voltage applied on the input side is converted into a mechanical oscillation. Consequently, when an alternating voltage is applied to the electrodes 6 in the first region 2, a mechanical wave that generates an output voltage in the second region 3 by means of the piezoelectric effect is formed within the piezoelectric materials 8, 13.

A high electrical voltage is generated between the output-side end region 5 and the end of the electrodes 6, 7 of the first region 2. This also creates a high potential difference between the output-side end region 5 and the surroundings of the piezoelectric transformer 1, sufficient to generate a strong electric field that ionizes a surrounding medium and causes the generation of a plasma. The field strength that is required for the ionization of the atoms or molecules or for the generation of radicals, excited molecules or atoms in the surrounding medium is referred to as the ignition field strength of the plasma. An ionization occurs if the electric field strength on the surface of the piezoelectric transformer 1 exceeds the ignition field strength of the plasma. The voltage at which the ignition field strength is achieved is called ignition voltage, in the following.

The piezoelectric transformer 1 can be used for generating a plasma in a variety of fields of application. In particular, the piezoelectric transformer 1 can be used for a plasma treatment of a surface. The surface can be part of a human body such as a finger. Alternatively, the treatment object can be any object having a surface comprising a material that for instance is to be cleaned and/or modified by a plasma treatment. In particular, the piezoelectric transformer 1 can be part of a hand-held device that needs not to be placed inside a gas chamber together with the treatment object.

FIGS. 2A, 2B, 2C and 2D show different base signals $S_{base}$, i.e., basic signal shapes of a voltage U over time t provided to the external electrodes 11, 12 for generating a plasma.

The frequency $f_{base}$ of the base signals $S_{base}$ may correspond to the resonance frequency of the piezoelectric transformer. The resonance frequency depends not only on internal factors of the transformer such as the geometry of the transformer but also on external factors such as a load established by the ignited plasma interacting with the substrate. Furthermore, the resonance frequency may also depend on the temperature of the transformer, for example.

A control circuit may register a shift between current and voltage and change the base signal so that current and voltage show nearly 0° phase shift. Alternatively or additionally, the field strength at the output region can be measured by a field probe and the frequency of the input signal can be adjusted such that a maximum field strength is achieved. In this case, the frequency of the base signal $S_{base}$ corresponds to the resonance frequency.

The resonance frequency may be below 100 kHz. As an example, the resonance frequency may be not higher than 99 kHz. The resonance frequency may be at least 10 kHz. The resonance frequency may be in a range from 10 kHz to 90 kHz, for example. In specific embodiments, the resonance frequency may be about 50 KHz.

Figure 2A:
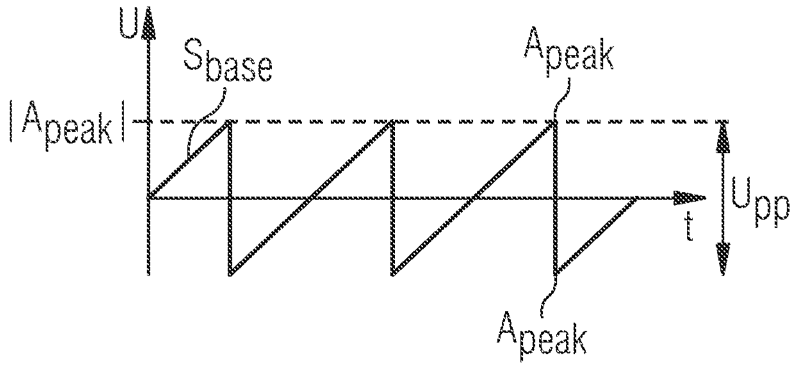
FIG. 2A, 2B, 2C, 2D show examples of different base signals.
Figure 2B:
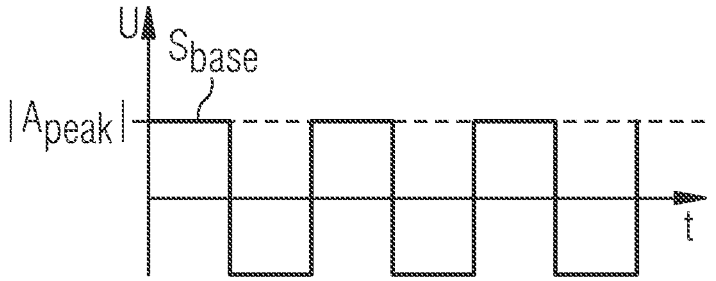
Figure 2C:
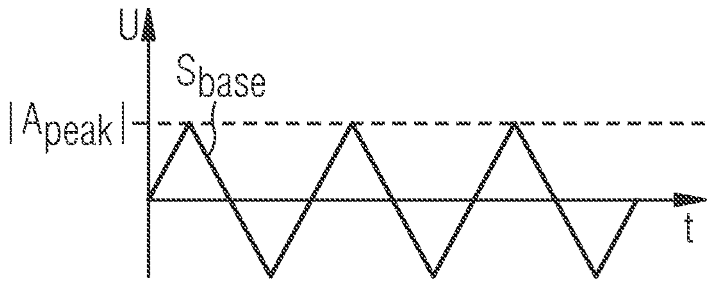
Figure 2D:
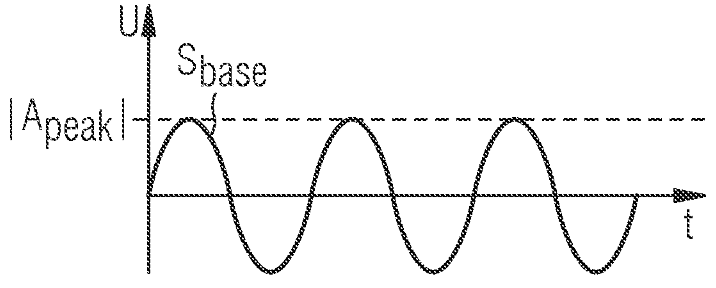

A base signal $S_{base}$ may have a saw-toothed shape as shown in FIG. 2A, a rectangular shape as shown in FIG. 2B, a triangular shape as shown in FIG. 2C or a sinusoidal shape as shown in FIG. 2D. Other shapes of base signals $S_{base}$ are possible.

Input voltages may be in the range of a few Volts while the output voltage at the tip of the transformer may be in the range of several kilo-Volts. As an example, a peak-to-peak input voltage $U_{pp}$, i.e., the distance between positive and negative peak amplitudes $A_{peak}$ may be in the range of 12 to 24 V and an output voltage may be up to 30 kV, for example. The absolute value of the peak amplitudes $|A_{peak}|$ is at a constant level.

During operation of the transformer so-called streamers may occur at the corners of the output-side end region, in the area of the ignited plasma. When these streamers hit the surface of a sensitive substrate, such as thin fabric or skin, local burn marks may occur. Accordingly, sensitive substrates may be damaged, which is an undesirable effect. Furthermore, the thermal power can lead to an undue increase of temperature in the substrate, which can damage the substrate.

In order to avoid local high temperature caused by such streamers, the absolute value of the peak amplitude $A_{peak}$ of an input signal provided to the transformer can periodically be reduced and increased to a level smaller and larger than ignition voltage of the plasma generator. A reduction of the absolute value of the peak amplitude $A_{peak}$ has the effect that the high local power density leading to a damage is reduced. In particular, a leakage current can be achieved, fulfilling also DIN specification DIN EN 60601-1 [3].

A resulting modulated input signal can be achieved by modulating the base signal, for example one of the base signals $S_{base}$ shown in FIGS. 2A to 2D, with a modulating signal.

Figure 3A:
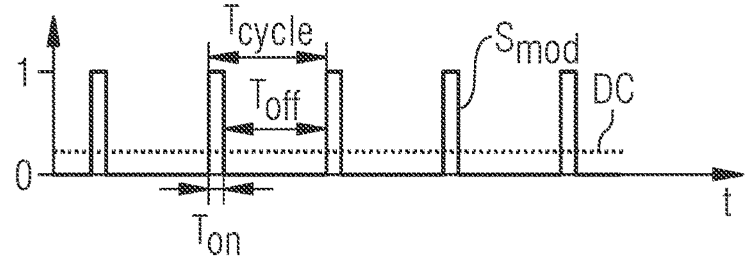
FIGS. 3A, 3B, 3C show examples of different modulating signals.
Figure 3B:
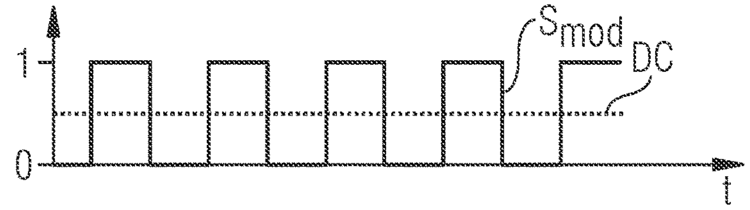
Figure 3C:
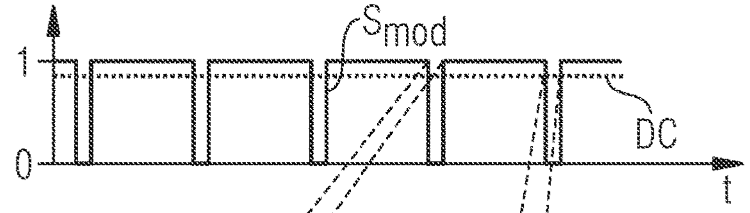

FIGS. 3A, 3B and 3C show different embodiments of modulating signals $S_{mod}$ having pulse shapes. The pulse signal shapes differ in their duty cycles DC. The duty cycle DC is the proportion of "on-time" $T_{on}$ in which for the resulting modulated input signal the absolute value of the peak amplitude is larger than the ignition voltage in one period of oscillation of the peak amplitude. The pulse signal shapes oscillate between a level of 1 and 0. The length of a pulse at a level of 1 corresponds to the "on-time", the time between such pulses corresponds to the "off-time".

The frequency of the modulating signal $S_{mod}$ is smaller than the frequency of the base signal $S_{base}$. A maximum frequency of the modulating signal may be 1/20 of the resonance frequency of the plasma generator. Thus, with a resonance frequency in the range of 10 kHz to 100 kHz, the maximum frequency of the modulating signal $S_{mod}$ is between 0.5 kHz and 5 kHz.

In order to dynamically adjust the frequency of the base signal $S_{base}$ such that it is near the resonance frequency of the plasma generator, the duty cycle DC has to be sufficiently large in order to obtain a sufficient number of periods of the base signal. At a frequency of the modulating signal $S_{mod}$ of 0.5 kHz the duty cycle DC may be at least 0.5% and at a frequency of 5 kHz at least 5%. In this case, at least ten full periods of a base signal $S_{base}$ with a frequency of 50 kHz are present in each duty cycle DC.

In FIG. 3A, the modulating signal $S_{mod}$ has a duty cycle DC of 20%, in FIG. 3B the modulating signal $S_{mod}$ has a duty cycle of 50% and in FIG. 3C the modulating $S_{mod}$ has a duty cycle of 80%. A base signal $S_{base}$ can be modulated by such a pulse modulating signal $S_{mod}$ by a switch which is periodically closed and opened, for example. As an example, a transistor may be used for switching the voltage.

Figure 4:
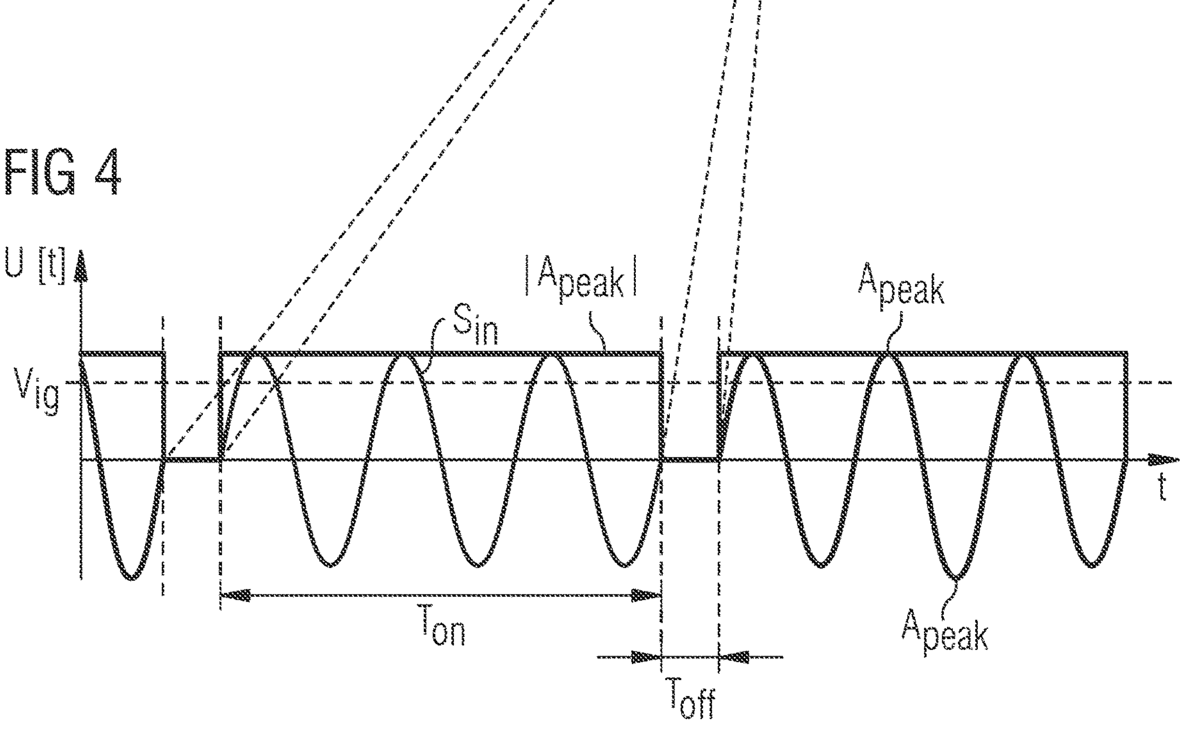
FIG. 4 shows an input signal for operating a piezoelectric transformer according to a first embodiment.

FIG. 4 shows an input signal $S_{in}$ resulting from a base signal $S_{base}$ having a sinusoidal shape as shown in FIG. 2D and being periodically being switched on and off according to a modulating signal $S_{mod}$ as shown in FIG. 3C. Thus, the absolute value of a peak amplitude $|A_{peak}|$ switches between the absolute value of the peak amplitude of the base signal and value of zero.

The resulting modulated signal $S_{mod}$ can be calculated by multiplying the base signal $S_{base}$ with the modulating signal $S_{mod}$, for example. A phase shift may be applied to ensure that the modulated signal $S_{mod}$ is always increased starting from zero voltage.

In order to make the ignition of plasma easier after an off-time $T_{off}$, the off-time $T_{off}$ should not be too long. As an example, a suitable duration of the off-time is 10 ms or shorter. In some embodiments, 5 ms may be an upper limit for the off-time.

The plasma generator may be operated such that the duty cycle DC is adjusted such that a desired amount of energy input to a substrate can be achieved. Such an adjustment can be made dynamically during operation, such that the duty cycle varies during operation.

The average energy emitted from the plasma generator depends on the duty cycle and frequency of the modulating signal $S_{mod}$. When the duty cycle is high, the emitted energy is high. When the duty cycle is low, the emitted energy is low.

Adjusting the duty cycle enables controlling a maximum energy transfer and a maximum patient leakage current without changing geometric distances, adding additional dielectric barrier and/or changing the process media, for example.

According to an embodiment, a parameter corresponding to an energy input in a substrate or a substrate surface is determined. Depending on the determined value, the duty cycle can be adjusted such that the average energy over time is increased or decreased.

When switching on the base signal again, the frequency $f_{base}$ of the base signal $S_{base}$ can be re-adjusted to the resonance frequency. For this aim, a parameter corresponding to a shift of the frequency from the resonance frequency may be obtained and the frequency of the base signal is re-adjusted such that it corresponds to the resonance frequency. Such a re-adjustment can be done in each cycle when the base signal is switched on again.

At a frequency of the modulating signal of 5 kHz, a re-adjustment will be done every 200 μs, accordingly.

Figure 5:
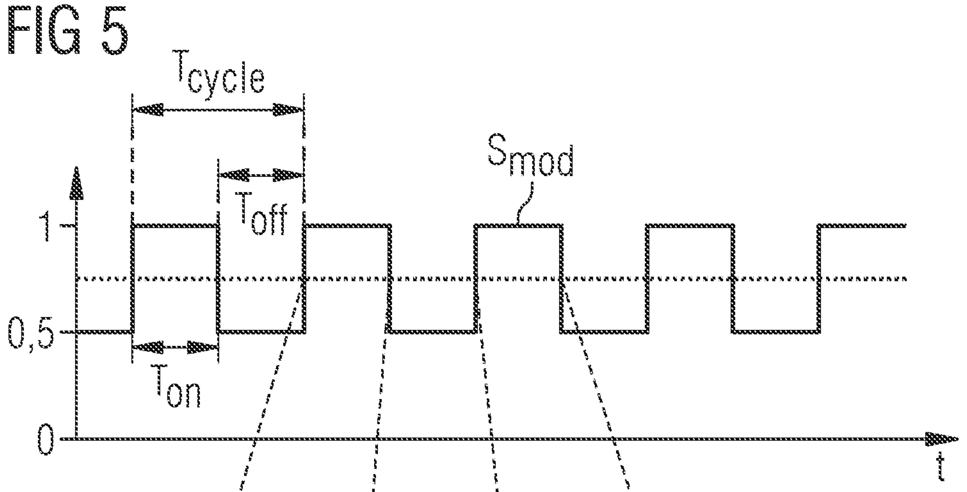
FIG. 5 shows a further example of a modulating signal.

FIG. 5 shows a further embodiment of a pulse-shaped modulating signal $S_{mod}$. In this embodiment, the modulating signal $S_{mod}$ oscillates between levels of 1 and 0.5.

Figure 6:
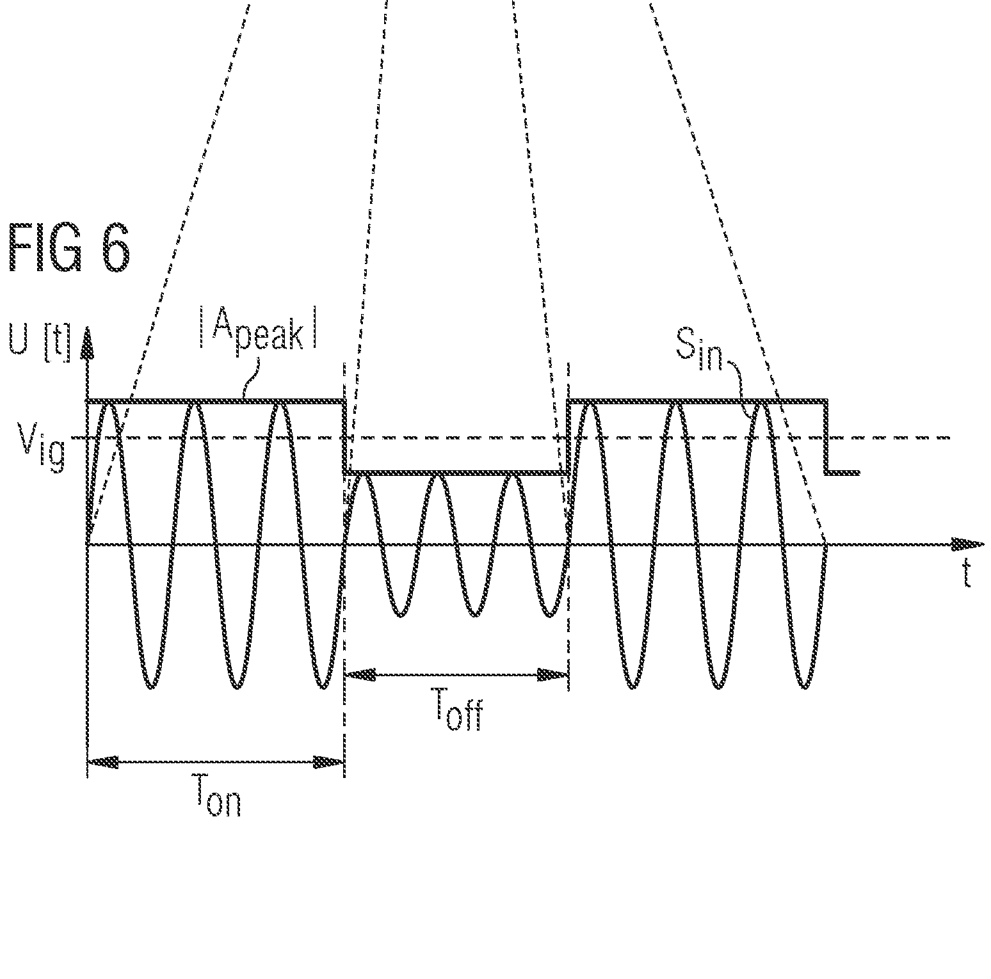
FIG. 6 shows an input signal for operating a piezoelectric transformer according to a further embodiment.

FIG. 6 shows the resulting input signal $S_{in}$ obtained by a sinusoidal base signal $S_{base}$ modulated by the modulating signal $S_{mod}$ of FIG. 5. During the off-time $T_{off}$ the absolute value of the peak amplitude $|A_{peak}|$ is not zero but half the amplitude of the absolute value $|A_{peak}|$ during on-time $T_{on}$. During the off-time $T_{off}$ the absolute value of the peak amplitude $|A_{peak}|$ is smaller than the ignition voltage Vig and plasma generation is stopped.

Other levels of the pulse-shaped modulating signal $S_{mod}$ are possible. However, the low level should be low enough such that the input voltage is lower than the ignition voltage and the plasma collapses. The low level may be chosen high enough to maintain an oscillation of the component, such that the next ignition starts at a lower ignition voltage and can be reached by only a slight increase in input voltage. By such a "warm" restart, the mechanical stress on the component can be reduced and the reliability can be significantly increased.

Such a modulation has the advantage that an oscillating motion of the piezoelectric transformer is upheld between the high pulses.

Figure 7:
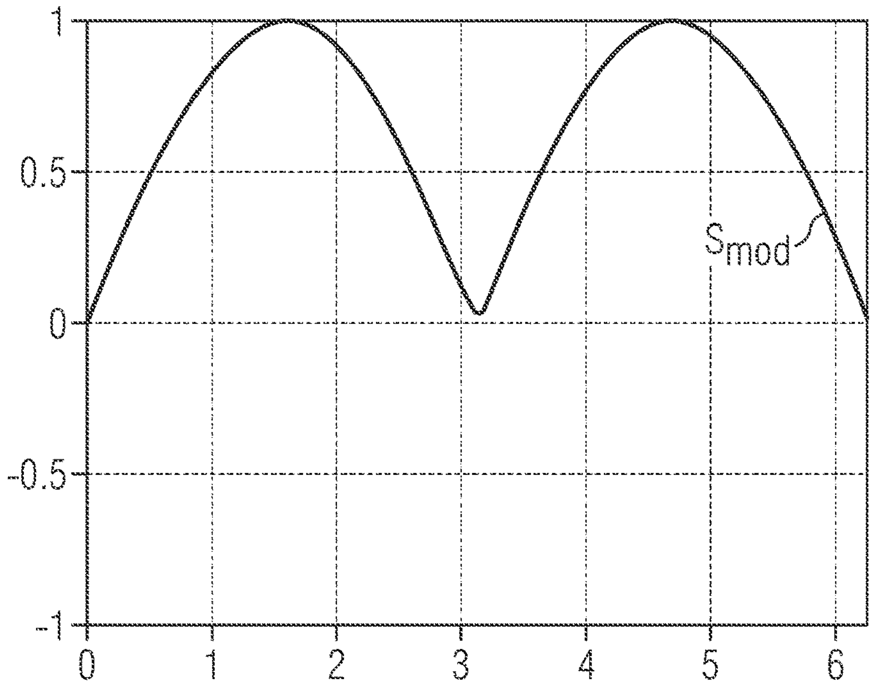
FIG. 7 shows a further example of a modulating signal.

FIG. 7 shows a further example of a modulating signal $S_{mod}$ in which the signal continuously oscillates in difference to switching between fixed levels as shown in FIGS. 3A to 3C and FIG. 5. The modulating signal $S_{mod}$ has a shape of an absolute value of a sinusoidal oscillation. The shown continuous oscillation is suitable for maintaining a continuous oscillation of the piezoelectric transformer.

Figure 8:
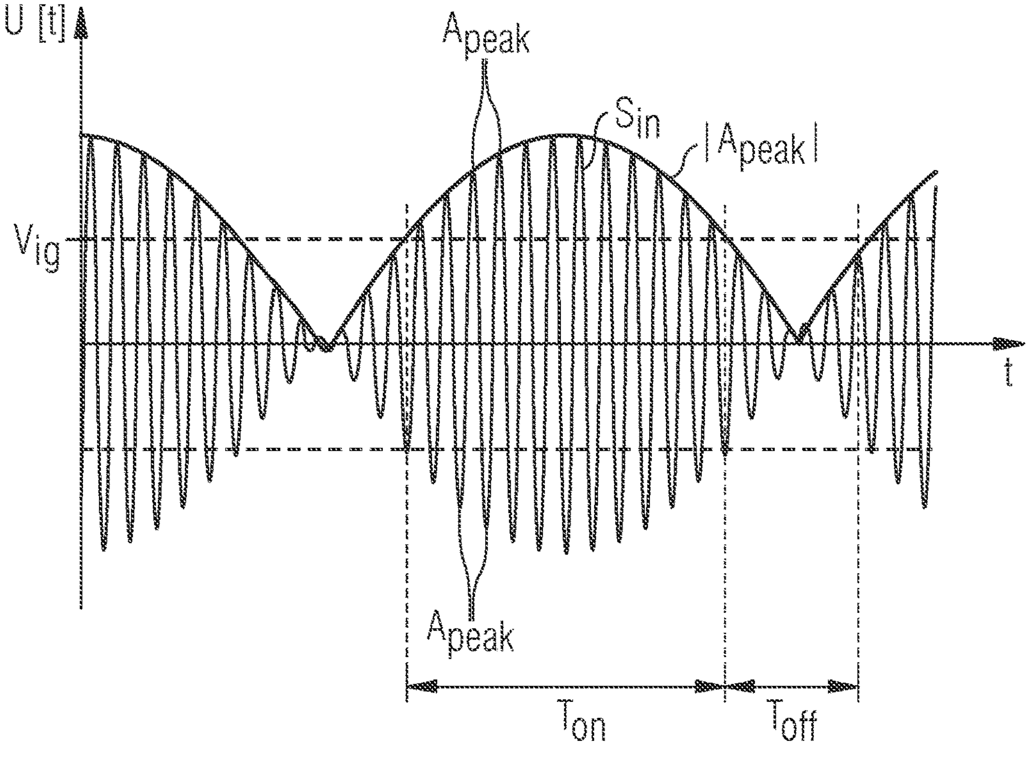
FIG. 8 shows an input signal for operating a piezoelectric transformer according to a further embodiment.

FIG. 8 shows an embodiment of an input signal $S_{in}$, wherein the absolute value of the peak amplitude $|A_{peak}|$ continuously oscillates. The input signal $S_{in}$ is based on a sinusoidal base signal modulated by the modulating signal $S_{mod}$ shown in FIG. 7. The course of the peak amplitude $|A_{peak}|$ follows an enveloping curve having the shape of the modulating signal $S_{mod}$.

A duty cycle DC of the resulting amplitude-modulated input signal $S_{in}$ is also here the "on-time" $T_{on}$ in which the absolute value of the peak amplitude $|A_{peak}|$ of the input signal $S_{in}$ is larger than the ignition voltage and plasma is generated, in relation to the length of a full period of oscillation of the absolute value of the peak amplitude, i.e. the sum of the "on-time" $T_{on}$ and the "off-time" $T_{off}$, in which the absolute value of the peak voltage is smaller than the ignition voltage Vig.

Also in this embodiment, the peak amplitude $|A_{peak}|$ during off-time may be such that plasma generation collapses during off-time, but at the same time, oscillation of the piezoelectric transformer is maintained during off-time. The peak amplitude $|A_{peak}|$ is for most of the off-time above zero. In particular, the input voltage U (t) has several periods of oscillation during off-time, wherein in a majority of the periods, the peak amplitude $|A_{peak}|$ is above zero. In the shown embodiment, the peak amplitude $|A_{peak}|$ is in the vicinity of zero for only a single period during off-time.

Figure 9:
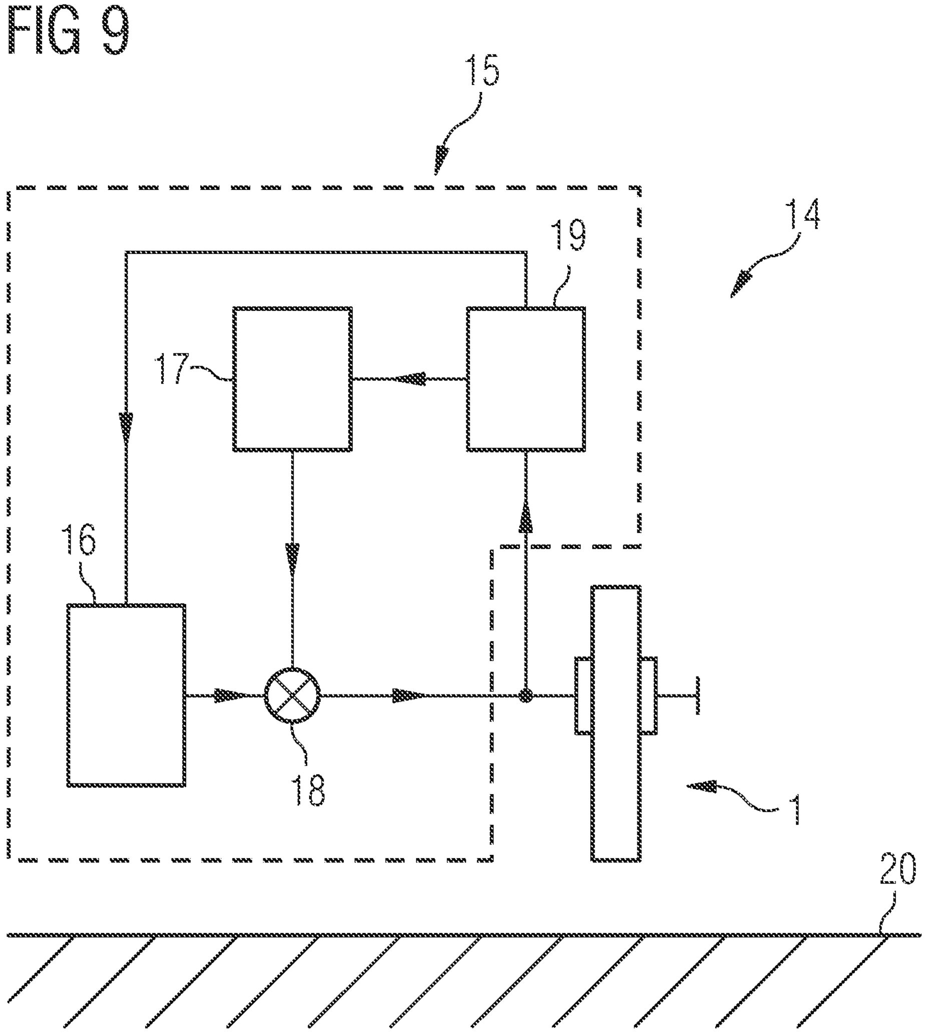
FIG. 9 shows a schematic circuit diagram of a piezoelectric plasma generator according to an embodiment.

FIG. 9 shows a piezoelectric plasma generator 14 comprising a control circuit 15 and a piezoelectric transformer 1.

The control circuit 15 comprises a base signal generator 16 supplying a base signal, e.g. one of the base signals shown in FIGS. 2A to 2D. The control circuit 15 further comprises a modulating signal generator 17, in which a modulating signal is defined and a signal mixer 18 mixing, e.g., scaling, the base signal with the modulating signal such that a modulated input signal is generated.

The control circuit 15 further comprises a measuring device 19 which determines a parameter of the plasma generator 14 during operation. The measuring device 19 may determine a shift of the resonance frequency from the frequency of the base signal. The measuring device 19 may alternatively or additionally determine an energy input into a substrate and/or a current flow.

The measurement results of the measuring device may be provided to the base signal generator 16 such that the frequency of the base signal can be periodically adjusted to the resonance frequency.

Furthermore, the measurement results of the measuring device 19 may be provided to the modulating signal generator 17. The modulating signal generator 17 may adjust the duty cycle of the modulating signal in order to dynamically lower or increase the energy input into a substrate or a current flow.

In some embodiments, the input signal may be completely shut off depending on the measurement results. As an example, the input signal may be shut off when the energy input in a substrate is too high and/or too low.

REFERENCE NUMERALS

1 piezoelectric transformer
2 first region
3 second region
4 input-side end region
5 output-side end region
6 first internal electrode
7 second internal electrode
8 piezoelectric material
9 first side surface
10 second side surface
11 first external electrode
12 second external electrode
13 piezoelectric material
14 piezoelectric plasma generator
15 control circuit
16 base signal generator
17 modulating signal generator
18 signal mixer
19 measuring device
20 substrate
Z longitudinal direction
x stacking direction
$S_{in}$ input signal
$S_{base}$ base signal
$S_{mod}$ modulating signal
$f_{base}$ frequency of base signal (first frequency)
$f_{mod}$ frequency of modulating signal (second frequency)
$A_{peak}$ peak amplitude
$|A_{peak}|$ absolute value of peak amplitude
$U_{pp}$ peak-to-peak voltage
Vig ignition voltage
$T_{on}$ on-time
$T_{off}$ off-time
$T_{cycle}$ cycle-time
DC duty cycle

The invention claimed is:

1. A method of operating a piezoelectric plasma generator, comprising:

applying an input signal to a piezoelectric transformer of the piezoelectric plasma generator, wherein an absolute value of a peak amplitude of the input signal is periodically reduced and increased to a level smaller and larger than an ignition voltage of the plasma generator, such that plasma generation periodically collapses, and wherein the absolute value of the peak amplitude of the input signal switches between a high level and a low level, wherein the low level of the absolute value of the peak amplitude is above zero, or wherein the absolute value of the peak amplitude oscillates in accordance with a continuous envelope curve.

2. The method of claim 1, wherein a duty cycle, which is the proportion of on-time in which the absolute value of the peak amplitude is larger than the ignition voltage during one period of oscillation of the absolute value of the peak amplitude, is adjusted during operation of the plasma generator.

3. The method of claim 2, wherein a parameter correlated to an energy input in a substrate is measured during operation of the plasma generator, wherein the duty cycle is adjusted depending on the measured energy input.

4. The method of claim 1, wherein the absolute value of the peak amplitude of the input signal switches between a high level and a low level, wherein the low level of the absolute value of the peak amplitude is zero.

5. The method of claim 1, wherein the absolute value of the peak amplitude during off-time, in which the absolute value of the peak amplitude is smaller than the ignition voltage, is at least for most of the off-time above zero.

6. The method of claim 1, wherein the input signal is based on a base signal having a first frequency, wherein the base signal is modulated by a modulating signal having a second frequency, the second frequency being lower than the first frequency.

7. The method of claim 6, wherein the second frequency is at most 1/20 of the first frequency.

8. The method of claim 6, wherein after an off-time, in which the absolute value of the peak amplitude is smaller than the ignition voltage, the first frequency is adjusted to the resonance frequency of the plasma generator.

9. A piezoelectric plasma generator, comprising:

a piezoelectric transformer; and a control circuit for operating the plasma generator wherein the control circuit is configured to:

apply an input signal to the piezoelectric transformer, wherein an absolute value of a peak amplitude of the input signal is periodically reduced and increased to a level smaller and larger than an ignition voltage of the plasma generator, such that plasma generation periodically collapses, and wherein the absolute value of the peak amplitude of the input signal switches between a high level and a low level, wherein the low level of the absolute value of the peak amplitude is above zero, or wherein the absolute value of the peak amplitude oscillates in accordance with a continuous envelope curve.

10. The piezoelectric plasma generator of claim 9, wherein the control circuit comprises:

a base signal generator for generating a base signal having a first frequency;

a modulating signal generator for generating a modulating signal having a second frequency, the second frequency being smaller than the first frequency; and a signal mixer for mixing the base signal with the modulating signal to generate the input signal.

11. The piezoelectric plasma generator of claim 9, wherein the control circuit further comprises:

a measuring device for measuring a parameter related to an energy input provided by the plasma generator to a plasma-treated substrate, wherein a modulation signal is adjusted depending on the measured energy input.

12. The piezoelectric plasma generator of claim 9, wherein the control circuit is configured to adjust a duty cycle, which is the proportion of on-time in which the absolute value of the peak amplitude is larger than the ignition voltage in one period of oscillation of the absolute value of the peak amplitude, is adjusted during operation of the plasma generator.

13. The piezoelectric plasma generator of claim 10, further comprising:

a measuring device for measuring a parameter related to a shift of the first frequency from a resonance frequency of the plasma generator.

14. A piezoelectric plasma generator, comprising:

a piezoelectric transformer having electrodes; and a control circuit coupled to the piezoelectric transformer, the control circuit configured to:

generate a periodic input signal having a period spanning a first duration and a second duration, apply the periodic input signal to the electrodes of the piezoelectric transformer, wherein (i) in the first duration, an absolute value of a peak amplitude of the periodic input signal is below an ignition voltage of the plasma generator, and (ii) in the second duration, the absolute value of the peak amplitude of the periodic input signal and greater than the ignition voltage of the plasma generator, wherein the absolute value of a peak amplitude of the periodic input signal is a first value in the first duration and a second value in the second duration, the first value being greater than zero and less than the second value, or wherein the absolute value of the peak amplitude gradually increases or decreases during the period, the absolute value of the peak amplitude increasing or decreasing according to a continuous envelope curve.

15. The piezoelectric plasma generator of claim 14, wherein when the absolute value of the peak amplitude increases or decreases according to the continuous envelope curve, the absolute value of the peak amplitude increases in both the first duration and the second duration and the absolute value of the peak amplitude decreases in both the first duration and the second duration.

16. The piezoelectric plasma generator of claim 15, wherein the absolute value of the peak amplitude reaches a maximum during the second period and reaches a minimum during the first period.

* * * * *